United States Patent [19]
Nielsen et al.

[11] Patent Number: 6,166,594
[45] Date of Patent: Dec. 26, 2000

[54] SELF CALIBRATING DEMODULATOR SYSTEM

[75] Inventors: Larry E. Nielsen, Chicago; Gary J. Sgrignoli, Mt. Prospect, both of Ill.

[73] Assignee: Zenith Electronics Corporation, Glenview, Ill.

[21] Appl. No.: 09/388,047

[22] Filed: Sep. 1, 1999

[51] Int. Cl.[7] .............................. H03D 1/06; H04B 17/00; H04B 1/10; H03K 9/00
[52] U.S. Cl. ..................... 329/319; 329/345; 329/351; 375/224; 375/316; 455/67.1; 455/295
[58] Field of Search ..................... 329/318, 319, 329/349, 351, 353; 375/224, 229, 231, 232, 233, 316, 346, 350; 455/67.1, 226.1, 295, 296, 307, 310, 312

[56] References Cited

U.S. PATENT DOCUMENTS 4,972,433  11/1990  Yamaguchi et al. ............... 375/12
5,481,564  1/1996  Kakuishi et al. .................. 375/230

OTHER PUBLICATIONS

"Hewlett–Packard Journal", Dec. 1993, vol. 44, No. 6, pp. 10, 11, 17–19, 31–34 and 53–57.

*Primary Examiner*—David Mis

[57] ABSTRACT

A reference signal source produces a substantially distortion free reference signal which is supplied to a demodulator that is arranged to demodulate the substantially distortion free reference signal. A calibration filter and an equalizer are included downstream of the demodulator. A controller sets the calibration filter to initially pass the reference signal to the equalizer without substantial change to the reference signal. The controller subsequently calibrates the calibration filter in accordance with the demodulator caused distortion reduced by the equalizer.

25 Claims, 2 Drawing Sheets

SELF CALIBRATING DEMODULATOR SYSTEM

RELATED APPLICATION

The present application is related to U.S. patent application Ser. No. (7126).

TECHNICAL FIELD OF THE INVENTION

The present invention relates to a self calibrating demodulator system and, more particularly, to a self calibrating demodulator system which is calibrated on a reference signal in order to eliminate demodulator caused distortions.

BACKGROUND OF THE INVENTION

Demodulators are used in television applications in order to demodulate the intermediate frequency (IF) output of a tuner down to baseband for further processing by a receiver. Professional demodulators are special examples of demodulators that are typically used in a laboratory or on a production line in order to test modulators, transmitters, and translators. However, professional demodulators have other uses such as monitoring broadcasts or cable transmissions, testing receivers, field testing television transmissions, and as exhibits used in demonstrations and seminars. In such cases, the professional demodulator receives an input signal to be monitored and provides various outputs representing the input signal which is received over an RF channel.

When testing transmission equipment, for example, there are generally two sources of distortion in the output of a professional demodulator. One source of distortion is the transmission equipment itself. The professional demodulator is typically provided with distortion correcting components, such as equalizers, in order to reduce distortion caused by the transmission equipment being tested.

The other source of distortion is the professional demodulator itself. This type of distortion is generally caused by variations in component performance characteristics and by component performance characteristics which change over time. For example, the tuner of a professional demodulator contributes to such demodulator caused distortion. In the case of tuner caused distortion, not only does the performance characteristics of the tuner change over time, but the performance characteristics of the tuner also change from channel to channel.

It is standard practice to calibrate a professional demodulator in the factory in order to reduce demodulator caused distortion. However, such calibration, although satisfactory at the time the professional demodulator leaves the factory, can soon become unsatisfactory because of the time related changes of the demodulator's performance characteristics.

Moreover, calibrating the professional demodulator in the factory poses the additional problem of determining the channel to which the professional demodulator should be calibrated. That is, a professional demodulator that is optimally calibrated in the factory at one channel is not optimally calibrated at another channel because, as discussed above, the performance characteristics of the demodulator's tuner change from channel to channel. Thus, a professional demodulator that is optimally calibrated in the factory at one channel may not be optimally calibrated when being used to test equipment operating at a different channel.

Accordingly, what is needed is a demodulator that overcomes one or more of the above stated problems.

SUMMARY OF THE INVENTION

In accordance with one aspect of the present invention, a demodulating arrangement comprises a reference signal source, an input, a switch, a tuner, a demodulator, a calibration filter, an equalizer, and a controller. The reference signal source is arranged to produce a substantially distortion free reference signal at a selected one of a plurality of channel frequencies. The input is arranged to receive an external source signal at the selected channel frequency. The switch is arranged to selectively pass the substantially distortion free reference signal and the external source signal in order to provide a switch output. The tuner is arranged to selectively tune to the switch output in order to provide a tuner output. The demodulator is arranged to demodulate the tuner output. The controller is arranged to control the switch, the tuner, the calibration filter, and the equalizer so that the switch is arranged to connect the substantially distortion free reference signal to the tuner each time the tuner is tuned to a new channel, so that the tuner is tuned to the reference signal, so that the calibration filter is initially set to pass the reference signal to the equalizer, and so that the equalizer calibrates the calibration filter according to demodulator caused distortion in the reference signal.

In accordance with another aspect of the present invention, a method is provided to calibrate a demodulator. The demodulator has a calibration filter and an equalizer. The calibration filter includes taps, and the equalizer includes taps having tap values. The method comprises the following steps: a) supplying a substantially distortion free calibration reference signal to the demodulator, wherein the tap values of the taps of the equalizer adjust to reduce distortion in the calibration reference signal; b) transferring the adjusted tap values to the taps of the calibration filter; and, c) supplying an external source signal to the demodulator so that the calibration filter reduces demodulator caused distortion in the external source signal based upon the transferred tap values and so that the equalizer reduces distortion caused by other sources.

In accordance with yet another aspect of the present invention, a calibration arrangement for a demodulator comprises a demodulator, an equalizer, a calibration filter, and a controller. The demodulator is arranged to demodulate a substantially distortion free calibration reference signal. The equalizer is arranged to reduce demodulator caused distortion in the calibration reference signal. The controller is arranged to adjust the calibration filter dependent upon the reduction of the demodulator caused distortion in the calibration reference signal effected by the equalizer so that the calibration filter reduces the demodulator caused distortion in an external source signal.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
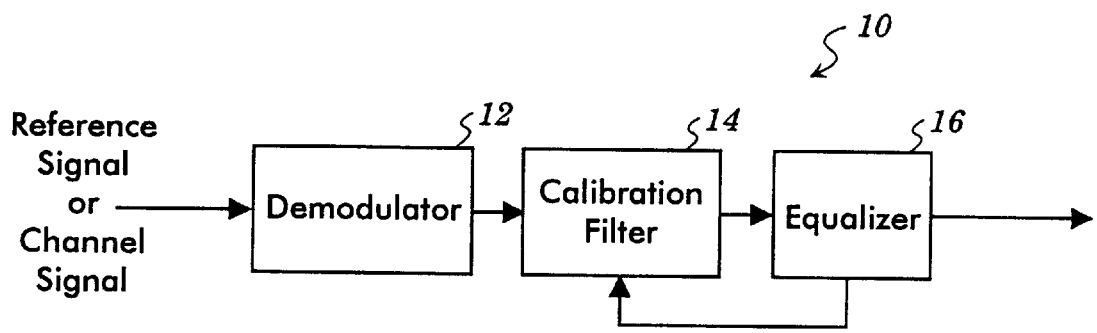
FIG. 1 is a block diagram illustrating a self calibrating demodulator system in accordance with the present invention.

A self calibrating demodulator system 10 as illustrated in FIG. 1 includes a demodulator 12, a calibration filter 14, and an equalizer 16. The demodulator 12, for example, may include an analog IF root raised cosine surface acoustic wave (SAW) bandpass filter providing anti-aliasing filtering, bandlimiting, and good adjacent channel rejection. The filter output may be amplified with gain controlled amplifiers and may be synchronously demodulated using a frequency-phase locked loop which may be arranged to track the small VSB pilot that is typically provided in ATSC compliant VSB signals. The level-controlled I-channel analog output may be lowpass filtered in order to remove unwanted frequencies created in the down conversion mixer of the demodulator 12.

Figure 3:
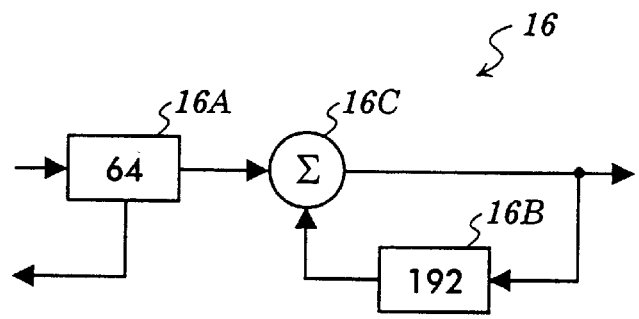

The calibration filter 14, for example, may be a 64 tap linear tapped delay line variable filter capable of correcting demodulator caused distortions (magnitude and/or group delay) such as, for example, demodulator caused linear distortions. As shown in FIG. 3, the equalizer 16, for example, may comprise a pre-calibration section 16A including 64 feedforward taps, a post-calibration section 16B including 192 feedback taps, and a summer 16C. The output of the pre-calibration section 16A is supplied to a first input of the summer 16C, and the output of the summer 16C is fed back through the post-calibration section 16B to a second input of the summer 16C. The equalizer 16, for example, optimizes the data eyes of any received distorted signals. The equalizer 16 may also be followed by a phase tracker (not shown) in order to remove phase noise.

During self calibration, the demodulator 12 is provided with a substantially distortion free calibration reference signal, such as a substantially distortion free ATSC compliant VSB calibration reference signal, at any selected one of a number of RF channels. Preferably, the substantially distortion free calibration reference signal may be provided at each of the RF channels in use so that the self calibrating demodulator system 10 can be used to test any transmitter. The substantially distortion free calibration reference signal is demodulated by the demodulator 12. The calibration filter 14 is initially set so that it does not filter the demodulated calibration reference signal. Accordingly, the demodulated calibration reference signal passes substantially unchanged through the calibration filter 14 to the equalizer 16. The equalizer 16 adjusts in order to reduce any frequency and/or phase distortion introduced into the substantially distortion free calibration reference signal by the demodulator 12 and any other equipment of the self calibrating demodulator system 10 which is upstream of the calibration filter 14. When the output of the equalizer 16 is a demodulated version of the substantially distortion free calibration reference signal provided to the demodulator 12 (within some tolerance), the distortion reducing adjustment made by the equalizer 16 is used to re-configure the calibration filter 14 so that the calibration filter 14 removes any demodulator caused distortion when the demodulator 12 is provided with an external source signal instead of the substantially distortion free calibration reference signal.

After self calibration, an RF channel signal from an external source such as transmission or other equipment being tested may then be provided to the demodulator 12 which demodulates this external source signal. The reconfigured calibration filter 14 removes demodulator caused distortion from the demodulated external source signal, and the equalizer 16 removes transmission equipment or channel caused distortion from the demodulated external source signal. The output of the equalizer 16, therefore, produces a substantially accurate indication of the performance of the equipment being tested or the amount of channel propagation distortion.

Figure 2:
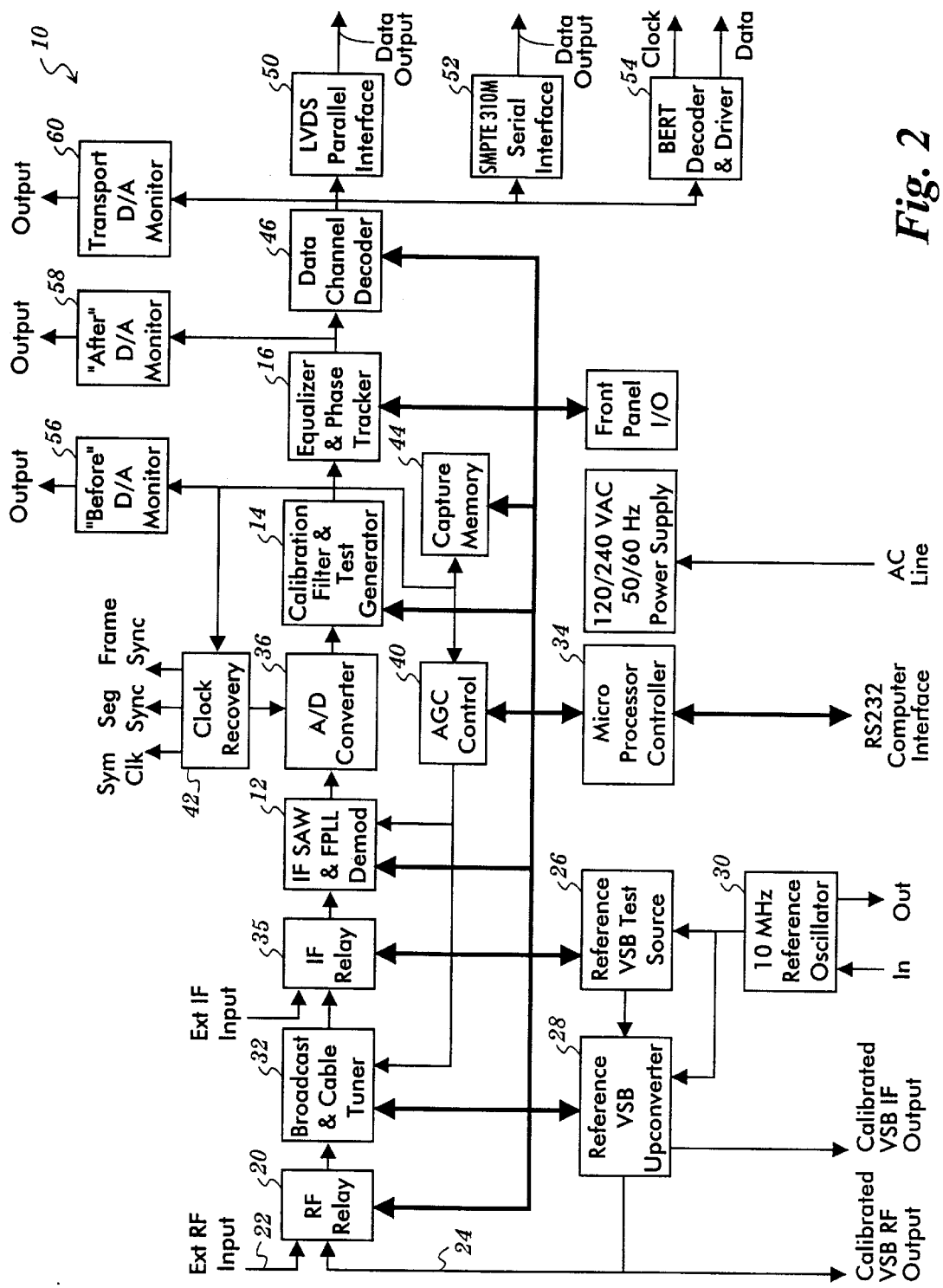
FIG. 2 illustrates additional features that may be provided in the self calibrating demodulator system shown in FIG. 1; and, FIG. 3 shows an exemplary equalizer that may be used in the self calibrating demodulator system shown in FIGS. 1 and 2.

As shown in FIG. 2, various other functions may be provided in the self calibrating demodulator system 10, if desired. For example, an input switch 20 has first and second inputs 22 and 24. The first input 22 receives a channel signal at RF from an external source, such as equipment to be tested. The second input 24 receives the substantially distortion free calibration reference signal at an RF channel frequency selected to match the frequency of the RF channel signal at the input 22.

The substantially distortion free calibration reference signal at the second input 24 is provided by a reference test source 26 and a reference up converter 28. The reference test source 26, for example, may be an ATSC-compliant VSB reference generator containing four fields of mode 8T VSB test data. In addition, the reference test source 26 may contain two fields each of mode 2, 4, 8, and 16 VSB test data.

As is known, "mode" refers to the number of modulation levels that are used to transmit bits of information. Thus, if mode=2, two modulation levels are used to transmit one bit of non-trellis encoded data; if mode=4, four modulation levels are used to transmit two bits of non-trellis encoded data; if mode=8, eight modulation levels are used to transmit three bits of non-trellis encoded data; if mode=8T, eight modulation levels are used to transmit two bits of trellis encoded data; and, if mode=16, sixteen modulation levels are used to transmit four bits of non-trellis encoded data.

The reference test source 26 stores the substantially distortion free calibration reference data in modulated form. The reference test source 26 may include a digital to analog converter (not shown) so that the stored calibration reference data is converted to analog as it is clocked out of the reference test source 26. The calibration reference data may be arranged so that, as it is clocked out of the reference test source 26, it is converted by the digital to analog converter to a low IF signal.

The reference up converter 28 contains a synthesizer whose frequency reference is provided by the oscillator 30. Accordingly, the modulated data from the reference test source 26 is up converted by the reference up converter 28 to a selected one of a plurality of RF channels to which a tuner 32 is tuned as controlled by a controller 34, and the upconverted modulated data is provided to the second input 24 as the substantially distortion free calibration reference signal. For example, if the self calibrating demodulator system 10 is being used to test a transmitter that transmits over channel A, then the reference up converter 28 is controlled by the controller 34 to upconvert the low IF signal from the reference test source 26 to the frequency of channel A. On the other hand, if the self calibrating demodulator system 10 is being used to test a transmitter that transmits over channel B, then the reference up converter 28 is controlled by the controller 34 to upconvert the low IF signal from the reference test source 26 to the frequency of channel B. In this manner, the same substantially distortion free calibration reference data can be used for a variety of RF channels.

During self calibration, the controller 34 controls the input switch 20 to pass to the tuner 32 the calibration reference signal at the second input 24 of the input switch 20. The controller 34 also instructs the reference test source 26 to provide the calibration reference data to the reference up converter 28 and controls the reference up converter 28 to provide an output RF signal based on this calibration reference data at the frequency of the selected RF channel. The controller 34 controls the tuner 32 to tune to this channel.

The tuner 32 converts the RF calibration reference signal to IF and supplies the calibration reference signal at IF to one input of an output switch 35. Another input of the output switch 35 receives an external IF signal. The output of the output switch 35 (in this case the calibration reference signal at IF) is demodulated by the demodulator 12 in order to provide baseband data to an analog to digital converter 36. The analog to digital converter 36 may be arranged to sample the baseband I-channel output of the demodulator 12 at the conventional symbol rate of a digital television system and to convert this output from the demodulator 12 to corresponding digital values.

During self calibration, the controller 34 controls the calibration filter 14 so that the output of the analog to digital converter 36 is passed through only one tap of the calibration filter 14. Accordingly, the calibration filter 14 does not filter, or otherwise impose a substantial change on, the digital, demodulated calibration reference signal. The digital, demodulated calibration reference signal is equalized for optimum data eyes in the equalizer 16, as discussed above.

As the tap values of the taps of the equalizer 16 adjust to reduce distortion in the digital, demodulated calibration reference signal, all or part of the tap values can be read from the equalizer 16 by the controller 34 for further analysis. For example, the controller 34 may be arranged to transfer the correction values (e.g., ten-bit tap gain values) of the sixty-four correction taps from the pre-calibration section 16A of the equalizer 16 to the calibration filter 14 when adjustment is complete. Also, signal to noise parameters before and after the equalizer 16 may be calculated by the controller 34 in order to indicate how much correction is being performed by the equalizer 16 and consequently how much distortion is in the digital, demodulated calibration reference signal.

Following self calibration, the input switch 20 is controlled by the controller 34 so that an external source signal at RF on the first input 22 is passed to the tuner 32. The tuner 32 tunes to the selected RF external source signal thereby converting the selected RF external source signal to an intermediate frequency which is then demodulated to baseband by the demodulator 12 and converted to digital by the analog to digital converter 36. The calibration filter 14 reduces or substantially removes demodulator caused distortion from the digital, demodulated external source signal output of the analog to digital converter 36, and the equalizer 16 reduces or substantially removes transmission equipment caused distortion from the filtered, digital, demodulated external source signal output of the calibration filter 14.

An automatic gain control 40 may be provided in order to perform automatic gain control on the total received baseband VSB signal. After analog to digital conversion by the analog to digital converter 36, the average power in the output of the calibration filter 14 is compared by the automatic gain control 40 to a pre-defined DC value, and the RF/IF gains are varied until the baseband I-channel digital signal is at its proper level. This automatic gain control prevents both analog and digital circuits from overloading, and is performed in the digital domain so that there is no "droop" problem. The RF automatic gain control may be delayed from the IF automatic gain control until a preset input level (i.e., the AGC delay point) so that the RF gain of the tuner 32 is maximum at minimum input signal level in order to achieve an improved noise figure.

A clock recovery block 42 may be provided in order to recover certain synchronization signals from the output of the calibration filter 14. For example, if the demodulator 12 is arranged to demodulate ATSC compliant digital television signals, the clock recovery block 42 recovers the symbol clocks and the segment and frame syncs of ATSC defined fields. The clock recovery block 42, for example, may use traditional narrow band digital correlation techniques in order to extract the symbol clocks and the segment and frame syncs.

The self calibrating demodulator system 10 may also include a capture memory 44. For example, if the demodulator 12 is arranged to demodulate digital television signals, the capture memory 44 can be arranged to capture any one of the 313 segments in either of two transmitted ATSC defined fields. The capture memory 44 may be arranged so that, once the field and segment field numbers have been identified by the controller 34, the capture of specific segments may begin.

A decoder 46 may be provided in order to decode the data at the output of the equalizer 16. Again, if the self calibrating demodulator system 10 is designed to process digital television signals, the decoder 46 may perform data de-randomization, Reed-Solomon forward error correction decoding, trellis decoding for VSB mode=8T, and data de-interleaving.

The self calibrating demodulator system 10 may also include various outputs. For example, a parallel low voltage differential system (LVDS) interface 50 may be provided in order to supply data meeting the digital video broadcast (DVB) parallel output standard. A serial interface 52 may be provided as a 75 Ω serial output which is SMPTE 310M compatible. A bit error rate tester decoder 54 may likewise be provided. For example, the bit error rate tester decoder 54 may contain a go/no-go detector capable of detecting any bit errors in a $2^{23}$ pseudo-random sequence test signal. The bit error rate tester decoder 54 may also be arranged to create appropriate burst clock and data signals that are buffered and available on BNC connectors.

Various output monitors 56, 58, and 60 are provided to monitor the data before equalization, after equalization, and after decoding.

Certain modifications of the present invention have been discussed above. Other modifications will occur to those practicing in the art of the present invention. For example, as described above, the calibration filter 14 may be a 64 tap linear tapped delay line variable filter. However, the calibration filter 14 can be any other suitable type or length of filter.

Moreover, as described above, the equalizer 16 may be a 256 tap filter such as a 256 tap FIR filter having a 64 tap pre-calibration section and a 192 tap post-calibration section. However, the equalizer 16 may be any other suitable equalizer.

Furthermore, the reference generator which is provided to supply the substantially distortion free reference signal to the input 24 is described above as an ATSC-compliant VSB reference generator comprising the reference test source 26 and the reference up converter 28. It should be understood, however, that the reference generator may be any reference generator suitable for supplying a reference signal to the input 24.

Also, as described above, the reference test source 26 stores substantially distortion free calibration reference data which may be ATSC-compliant VSB reference data. This data should include the frame and segment synchronization and DC bias of a typical ATSC compliant VSB digital broadcast signal. Such data produces a reference signal useful in calibrating the demodulator 12. However, the reference data stored in the reference test source 26 may also be randomized, Reed Solomon forward error corrected, trellis encoded in the case of the 8T VSB mode, and interleaved so that the generated reference signal can also be used during a self-test in order to verify the decoding circuits of the self calibrating demodulator system 10.

Additionally, the controller 34 may be arranged to cause the switch 20 to automatically switch the input 24 to the output of the switch 20 and to cause the reference test source 26 and the reference up converter 28 to supply a substantially distortion free calibration reference signal through the switch 20 to the tuner 32 whenever the controller 34 causes the tuner 32 to tune to a new channel or upon each new start-up use of the self calibrating demodulator system 10.

Moreover, the present invention is directed to a calibration arrangement and method which is suitable for calibrating an ATSC compliant VSB demodulator. However, the present invention may also be used calibrate a QAM compliant demodulator.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A demodulating arrangement comprising:
    a reference signal source arranged to produce a substantially distortion free reference signal at a selected one of a plurality of channel frequencies;
    an input arranged to receive an external source signal at the selected channel frequency;
    a switch arranged to selectively pass the substantially distortion free reference signal and the external source signal in order to provide a switch output;
    a tuner arranged to tune to the switch output in order to provide a tuner output;
    a demodulator arranged to demodulate the tuner output;
    a calibration filter;
    an equalizer; and,
    a controller, wherein the controller is arranged to control the switch, the tuner, the calibration filter, and the equalizer so that the switch is arranged to connect the substantially distortion free reference signal to the tuner each time the tuner is tuned to a new channel, so that the tuner is tuned to the reference signal, so that the calibration filter is initially set to pass the reference signal to the equalizer, and so that the equalizer calibrates the calibration filter according to demodulator caused distortion in the reference signal.

2. The demodulating arrangement of claim 1 wherein the controller is arranged to control the tuner to subsequently tune to the external source signal so that the adjusted calibration filter substantially filters out distortion caused by the demodulator and so that the equalizer reduces distortion from other sources.

3. The demodulating arrangement of claim 2 wherein the calibration filter is a filter having multiple taps, and wherein the taps are adjusted by the equalizer to reduce the demodulator caused distortion.

4. The demodulating arrangement of claim 3 wherein the equalizer has multiple taps, wherein tap values of the taps of the equalizer adjust to the demodulator caused distortion when the tuner is tuned to the reference signal, and wherein the tap values of the equalizer are transferred to the calibration filter in order to calibrate the calibration filter to reduce the demodulator caused distortion when the tuner is tuned to the external source signal.

5. The demodulating arrangement of claim 1 wherein the controller is arranged to control the tuner to tune to the reference signal and to subsequently tune to the external source signal so that, when the tuner tunes to the reference signal, the equalizer calibrates the calibration filter to reduce the demodulator caused distortion and so that, when the tuner tunes to the external source signal, the adjusted calibration filter reduces demodulator caused distortion in the external source signal.

6. The demodulating arrangement of claim 5 wherein the calibration filter is a filter having multiple taps, and wherein the taps are adjusted by the equalizer to reduce the demodulator caused distortion.

7. The demodulating arrangement of claim 6 wherein the equalizer has multiple taps, wherein tap values of the taps of the equalizer adjust to the demodulator caused distortion when the tuner is tuned to the reference signal, and wherein the tap values of the equalizer are transferred to the calibration filter in order to calibrate the calibration filter to reduce the demodulator caused distortion when the tuner is tuned to the external source signal.

8. The demodulating arrangement of claim 1 wherein the calibration filter is a filter having multiple taps, and wherein the taps are adjusted by the equalizer to reduce the demodulator caused distortion.

9. The demodulating arrangement of claim 8 wherein the equalizer has multiple taps, wherein tap values of the taps of the equalizer adjust to the demodulator caused distortion when the tuner is tuned to the reference signal, and wherein the tap values of the equalizer are transferred to the taps of the calibration filter in order to calibrate the calibration filter to reduce the demodulator caused distortion when the tuner is tuned to the external source signal.

10. The demodulating arrangement of claim 1 wherein the substantially distortion free reference signal is a substantially distortion free ATSC compliant VSB reference signal.

11. A method of calibrating a demodulator, wherein the demodulator has a calibration filter and an equalizer, wherein the calibration filter includes taps, wherein the equalizer includes taps having tap values, wherein the method comprises the following steps:
    a) supplying a substantially distortion free calibration reference signal to the demodulator, wherein the tap values of the taps of the equalizer adjust to reduce distortion in the calibration reference signal;
    b) transferring the adjusted tap values to the taps of the calibration filter; and,
    c) supplying an external source signal to the demodulator so that the calibration filter reduces demodulator caused distortion in the external source signal based upon the transferred tap values and so that the equalizer reduces distortion caused by other sources.

12. The method of claim 11 wherein step a) comprises the step of controlling a tuner to selectively tune to the substantially distortion free calibration reference signal and the external source signal.

13. The method of claim 12 wherein step a) comprises the step of selectively switching an input of the tuner between the substantially distortion free reference signal and the external source signal.

14. The method of claim 13 wherein step a) comprises the step of analog to digital converting the reference signal and the external source signal.

15. The method of claim 11 wherein the substantially distortion free calibration reference signal is a substantially distortion free ATSC compliant VSB calibration reference signal.

16. The method of claim 11 wherein steps a) and b) are performed automatically before the external source signal of a different channel is supplied in accordance with step c).

17. A calibration arrangement for a demodulator comprising:
- a demodulator arranged to demodulate a substantially distortion free calibration reference signal;
- an equalizer arranged to reduce demodulator caused distortion in the calibration reference signal;
- a calibration filter; and,
- a controller, wherein the controller is arranged to adjust the calibration filter dependent upon the reduction of the demodulator caused distortion in the calibration reference signal effected by the equalizer so that the calibration filter reduces the demodulator caused distortion in an external source signal.

18. The calibration arrangement of claim 17 wherein the calibration filter is between the demodulator and the equalizer.

19. The calibration arrangement of claim 18 wherein the controller is arranged to control the calibration filter so that the calibration filter initially passes the calibration reference signal without substantial change before the calibration filter is adjusted by the controller and so that the calibration filter reduces the demodulator caused distortion in the external source signal after the calibration filter is adjusted.

20. The calibration arrangement of claim 19 wherein the calibration filter is a filter having multiple taps, and wherein the taps are adjusted by the equalizer to reduce the demodulator caused distortion.

21. The calibration arrangement of claim 20 wherein the equalizer has multiple taps, wherein tap values of the taps of the equalizer adjust to the demodulator caused distortion when the tuner is tuned to the substantially distortion free reference signal, and wherein the tap values of the equalizer are transferred to the calibration filter in order to calibrate the calibration filter to reduce the demodulator caused distortion when the tuner is tuned to the external source signal.

22. The calibration arrangement of claim 17 wherein the calibration filter is a filter having multiple taps, and wherein the taps are adjusted by the equalizer to reduce the demodulator caused distortion.

23. The calibration arrangement of claim 22 wherein the equalizer has multiple taps, wherein tap values of the taps of the equalizer adjust to the demodulator caused distortion when the tuner is tuned to the substantially distortion free reference signal, and wherein the tap values of the equalizer are transferred to the calibration filter in order to calibrate the calibration filter to reduce the demodulator caused distortion when the tuner is tuned to the external source signal.

24. The calibration arrangement of claim 17 wherein the substantially distortion free calibration reference signal is a substantially distortion free ATSC compliant VSB calibration reference signal.

25. The calibration arrangement of claim 17 wherein the controller is arranged to cause a calibration to be performed whenever the demodulator is to receive an external source signal at a new RF channel frequency.

\* \* \* \* \*